Patented Feb. 18, 1947

2,416,074

UNITED STATES PATENT OFFICE 2,416,074

PREPARATION OF HEAVY METAL SOAPS

Arthur G. Weber, Bellevue Manor, and Clement H. Hamblet, Gordon Heights, Del., assignors to E. I. du Pont de Nemours & Company, Wilmington, Del., a corporation of Delaware No Drawing. Application September 21, 1943, Serial No. 503,268

9 Claims. (Cl. 260—414)

This invention relates to a process for the preparation of metallic salts of organic acids and more particularly to the preparation of metal soaps of the fatty acids.

Various methods have been proposed for the preparation of the metallic salts of the organic acids such, for example, as the reaction of the organic acid with a heavy metal oxide or carbonate or by the exposure of the metal to the warm vapors of the organic acids, the latter procedure being employed for the preparation of white lead, requiring many days and in some cases weeks in processing. These slow and tedious processes are unsuitable for rapid economical formation of the heavy metal salts of organic acids.

An object of the present invention is to provide a process for the preparation of metal salts of organic acids. Another object of the invention is to provide a process wherein organic acid esters can be converted to the corresponding metal salt by direct contact with a metal. A further object of the invention is to provide a process wherein the organic acid esters and more particularly the fatty acid esters are converted to lead salts by direct reaction with lead in the presence of oxygen. Other objects and advantages of the invention will hereinafter appear.

The above objects are accomplished in accord with the broadest aspects of the invention by a process wherein an organic acid ester is heated in the presence of water as such or as water vapor with a heavy metal while in contact with oxygen. More specifically, the process may be conducted by passing an oxygen-containing gas such as air, the organic acid and water into a converter charged with metal pellets, gas and ester flowing co-current or countercurrent through the converter.

The temperature of the reaction may very through wide limits according to the nature of the organic ester used and the heavy metal with which it is to react, the unsaturated acid esters being preferably reacted at a lower temperature than the saturated acid esters to inhibit degradation. When normally solid acid esters are treated they should be heated at least to that temperature at which they are fluid in order that the oxygen or oxygen containing gas can be easily bubbled through them. Generally speaking, however, temperatures may range between 50 and 200° C. and more specifically for the fatty acid esters, temperatures ranging between 70 and 150° C. with a preferred range for the preparation of the lead soaps of the fatty acids between 100 and 120° C. Atmospheric or superatmospheric pressures may be used.

The process of the invention is adapted to the preparation of heavy metal salts of any organic acid ester or mixture thereof. As examples of the organic acid esters that may be employed in accord with the process of the invention are esters of the fatty acids; acetic, propionic, butyric, caproic, lauric, palmitic, stearic, ricinoleic, melissic, and other members of the fatty acid series as well as the esters of the coconut oil, corn oil, cottonseed oil, rapeseed oil and similar vegetable oils; esters of the hydroxy acids such, for example, as glycolic acid, lactic acid, and tartaric acid; as well as mono and poly esters of the polycarboxylic acids such, for example, as oxalic acid, glutaric acid, and adipic acid; and the esters of the unsaturated acids such, for example, as acrylic acid and methacrylic acid, as well as the esters of the aromatic acids such, for example, as benzoic acid and napththenic acid.

Any suitable ester may be used such for example as the methyl, ethyl, propyl and higher alkyl esters of the above acids together with their glycerides and compounds similar to the glycerides such as the mono and di-acid esters of the glycols. Inasmuch as the glycerol and glycol derivatives of the organic acids are in effect esters they will in this specification and in the appended claims be included under the generic term esters.

The heavy metals that may be used include such metals as copper, cadmium, zinc, iron, nickel, silver, tin and especially lead although other salt forming metals may be reacted with the above compounds for the preparation of the corresponding acid salts.

Water should preferably be present in excess of the amount necessary to react with the organic acid ester, i. e., one-half a mole for the ester of a monobasic acid ester, one mole for a di-ester of a dibasic acid or a di-acid glycol ester, or put another way, one-half a mole for each ester group present. The molar excess may be 10 to 50 times that stoichiometrically required. It will be understood that in the claims the use of the word "water" will mean water as such or as its vapor.

The process may be carried out by a continuous or discontinuous procedure. The former may, for example, be illustrated by the use of a converter of considerably greater length than cross section disposed in a vertical position and charged with pellets of a metal which may be in the form of chips, flakes, or metal pellets of a suitable diameter such, as for example, from ⅛ to ½ inch. The organic acid ester to be converted to the metal salt and water are introduced into the converter together with an oxygen containing gas such as air and the reaction within the converter maintained at the optimum temperature for the particular type of ester being converted. When carried out in this manner the ester may be introduced at the top of the converter and the product collected from the bottom while air is bubbled up through the descending ester and the process thereby conducted under countercurrent flow conditions, the spent air being allowed to issue from the top of the converter carrying with it any excess water and the alcohol formed during the reaction. Contrariwise, both ester and air can be introduced into the bottom of the converter to give cocurrent flow, the product as well as the spent air, alcohol and water formed issuing from the top of the converter. To enhance the flow of fluids within the converter a portion of the reactants may be pumped from the top of the converter and reintroduced into the bottom thereof, the velocity and turbulence of the flow within the converter being regulated in part by the amount and degree of this recycled material. As will be appreciated by those skilled in the art the recycling may be conducted in the reverse order that is by taking the product from the bottom and reintroducing it into the top of the converter and a further modification may be effected by removing the product from the intermediate positions and returning it through intermediate positions to the converter. If desired, the throughput of ester may be adjusted to the length of the converter in order that substantially all of the ester is converted to its salt as it emerges from the converter.

The process may likewise be conducted batchwise which may be effected by charging a converter such as that described above or any suitable vessel with the metal particles and the ester to be reacted, the ester is raised to reaction temperature and the reaction continued until all of the ester has been converted to the salt whereupon it is discharged from the converter. Throughout the reaction air or oxygen or an oxygen containing gas is bubbled through or otherwise dispersed into the liquid. During batchwise processing it is likewise desirable to recirculate the reactants through the vessel which may be accomplished by an outside circuit provided with a suitable pump whereby the reactants are removed and returned to the vessel in order to maintain a constant, preferably turbulent, flow within the vessel.

When a converter of greater length than cross section is employed which prior to operation is charged with the metal pellets and water-insoluble ester and water introduced and/or alcohol formed gradually settles to the bottom of the converter. Since the ester is generally lighter than the water, the latter tends to collect in the bottom of the converter during the initial stages of the reaction. As the reaction proceeds and the metal salt increases in concentration in the converter the positions of water and ester product are reversed since the salts are invariably heavier. Unfortunately, this reversal in position takes place rapidly with the evaporation of an appreciable part of the water and with the result that unless due precautions are taken a large part of the charge will be blown from the top of the converter.

It has been found that the above disadvantageous result can be eliminated by recycling some of the material from the converter through an external separator. This inhibits the settling of large amounts of water and thereby renders it possible to conduct the reaction without loss of products from this cause.

The reaction of an ester with a metal is exothermic and consequently after the reaction has been initiated no further heat input is required but on the contrary means must be provided to withdraw the heat of reaction in order to maintain the temperature within proper bounds. Some of the heat of the reaction is adsorbed by the water discharged with the spent gas from the converter, another portion by the sensible heat in the spent gases but it has been found that in addition to these heat controlling means it is often desirable to provide excess water utilizing its sensible and latent heat to control the reaction within the preferred temperature range.

As has been indicated the process is applicable to the conversion of any organic acid ester to its metal salt. Inasmuch as some metal salts are soluble in the ester from which it is derived while others are not, a different procedure is recommended when metal salts of different types are to be made.

When the metal salt is soluble in the ester in which it is made it is merely necessary to maintain the temperature of the reaction above the transition point of the mixture or above that temperature at which the metal salt precipitates. In some cases, the solution of ester and salt can be withdrawn from the converter, cooled down to precipitate the salt, the salt separated by filtration and the ester returned to the converter. Analogous to the latter type of procedure is that used for the preparation of salts which are relatively insoluble in the ester. Under such circumstances it is usually desirable to effect the reaction in a mutual solvent for the ester and salt from which the salt can be crystallized or otherwise separated after withdrawing it from the reaction converter the unreacted ester being returned to the reaction.

The examples which follow illustrate embodiments of the invention in which parts are by weight and to which the invention is not to be limited:

*Example 1.*—A stainless steel tower with an internal diameter of 3⅞" and a height of 10' is completely filled with lead fragments, obtained by passing molten lead through a 1/16" tube into water, except for a 4" space at the bottom which is packed with ¼" glass pellets supported on a perforated cone. The tower is charged with 14,000 parts of coconut oil acid esters. Air and water are passed into the bottom of the tower while spent air, water vapor, the unconverted organic reactant and lead salts passed out of the top of the tower into a separator from which the spent air and water as vapor are discharged to the atmosphere. The unconverted organic acid ester together with the salt thereof is returned to the bottom of the tower. A valve is provided in the bottom of the recirculating line through which the lead soaps formed are discharged after the desired conversion had been reached.

Air is introduced into the tower at a space velocity of 95 and the reaction mixture is heated to a temperature of approximately 115° C. and 85% of the acyl groups present in the coconut oil fatty acids is converted in from two to three hours to lead soaps.

*Example 2.*—A glass jacketed tower with an internal diameter of 1.9 cm. and a height of 140 cm. is completely filled with lead fragments of about ¼" diameter. Air, water and the organic acid ester are passed into the bottom of the tower while spent air and unreacted water passed out of the top of the tower from which the spent air and water as vapor are discharged to the atmosphere. A valve is provided in the recirculating line through which the lead soap formed was discharged. The tower is charged with a mixture of 148 g. of esters of coconut oil fatty acids made by the esterification of the acids with the corresponding alcohols and 0.15 part hydroquinone and the mixture heated to a temperature of 150–160° C. while air is forced up through the tower at the rate of approximately 15 parts per hour. The exit gas is analyzed and found to contain from 20 to 20.7% oxygen indicating that substantially none of the ester had been converted to the lead salt. Forty one moles of water are then introduced into the tower per mole of ester and the addition of air continued at the same rate as before. Substantially immediately the exit gas from the tower analyzed 11.4% oxygen indicating that the reaction had set in. After approximately eight hours of operation the tower is discharged and it is found that nearly 100% of the ester had been converted to the corresponding lead salt of the coconut oil acid.

Example 3.—The tower of Example 2 is charged with lead pellets, 125 g. of methyl oleate and 0.18 part of hydroquinone, the reaction being maintained at 140° C. More than a stoichiometrical excess of water is added and air is introduced at a rate of about 15 parts per hour. After approximately eight hours operation an excellent yield of the lead salt is obtained.

As shown by the examples, the rate of oxygen flow may be varied and it has been found that this variation may range between a space velocity of 10 and 100, space velocity being defined as the unit volume of air passing per hour per superficial volume occupied by the metal particles in the tower, the fluid volumes being determined under standard temperature and pressure conditions. While the examples have described the use of air, other inert gas-oxygen mixtures may be employed or for that matter pure oxygen may be used.

The use of an antioxidant is highly advantageous when unsaturated organic esters are converted to their salts. The evolution of carbon dioxide indicates degradation of the acid or salt during the reaction and it has been found that the presence of an antioxidant inhibits and usually entirely eliminates this degradation. Suitable examples of antioxidants which may be employed are in addition to the hydroquinone described in the examples pyrogallol, phenol, phenyl-alpha-naphthyl amine, mesitols, and other suitable antioxidants. The antioxidant may be used in amounts ranging between 0.005 and 2% by weight based on the organic acid with a preferred range particularly for hydroquinone between 0.01 and 0.02.

We claim:

1. In a process for the preparation of lead soaps of fatty acids by reacting esters of the higher fatty acid with lead the step which comprises passing an alkyl ester of a higher unsaturated fatty acid and water over comminuted lead while bubbling oxygen through the liquid acid at a temperature between 50 and 200° C.

2. The process of claim 1 conducted in the presence of an antioxidant selected from the group consisting of hydroquinone, pyrogallol, phenol, phenyl-alpha-naphthylamine and the mesitals.

3. In a process for the preparation of heavy metal oleate by reacting an ester of oleic acid with a heavy metal the step which comprises passing an alkyl ester of oleic acid and water over a comminuted heavy metal while bubbling oxygen through the liquid ester, the reaction being conducted at a temperature between 70 and 150° C.

4. In a process for the preparation of a heavy metal soap of coconut oil acids by reacting the esters of coconut oil acids with heavy metal, the step which comprises passing alkyl esters of coconut oil acids and water over lead pellets while bubbling oxygen through the liquefied ester at a temperature between 70 and 150° C.

5. In a process for the preparation of a lead soap of coconut oil acids by reacting the esters of coconut oil acids with metallic lead, the step which comprises passing an alkyl ester of coconut oil acids and water over comminuted lead pellets while bubbling oxygen through the liquefied ester at a temperature between 70 and 150° C.

6. In a process for the preparation of heavy metal soaps of the fatty acids by reacting the esters of fatty acids containing unsaturation with a heavy metal the step which comprises passing an alkyl ester of a fatty acid containing unsaturation and water over a comminuted heavy metal while bubbling oxygen through the liquid ester, the degradation of the fatty acid ester and its soap being inhibited by the presence of hydroquinone.

7. In a process for the preparation of heavy metal soaps, the step which comprises passing an ester of a higher fatty acid and water over a comminuted heavy metal, at a temperature between 70 and 150° C., while bubbling oxygen through the liquid ester.

8. In a process for the preparation of lead soaps, the step which comprises passing over comminuted lead, an alkyl ester of a higher fatty acid and from 10 to 50 times the stoichiometrically required amount of water for reacting with the ester, while bubbling oxygen through the ester, the reaction being conducted at a temperature between 50 and 200° C.

9. In a process for the preparation of heavy metal soaps, the step which comprises passing over a comminuted heavy metal water and an alkyl ester of higher fatty acid which is in the liquid phase, by virtue of a mutual liquid solvent for the fatty acid ester and for the metal soap formed therefrom, while bubbling oxygen through the solution of the ester and soap at a temperature between 50 and 200° C.

ARTHUR G. WEBER.
CLEMENT H. HAMBLET.

REFERENCES CITED

The following references are of record in the file of this patent:

UNITED STATES PATENTS

| Number    | Name       | Date            |
|-----------|------------|-----------------|
| 2,159,864 | Serciron   | May 23, 1939    |
| 2,199,829 | Bogdan     | May 7, 1940     |
| 861,345   | Wultze     | July 30, 1907   |
| 1,097,099 | Kalkow     | May 19, 1914    |
| 1,990,320 | Fulweiler  | Feb. 5, 1935    |
| 2,157,767 | Long       | May 9, 1939     |
| 1,878,962 | Meidert    | Sept. 20, 1932  |

OTHER REFERENCES

Perry, "Chemical Engineer's Handbook," ed. 2, 1941, page 2096.